No. 801,466.
PATENTED OCT. 10, 1905.
J. R. LISTLE.
CAKE CUTTER.
APPLICATION FILED NOV. 3, 1904.
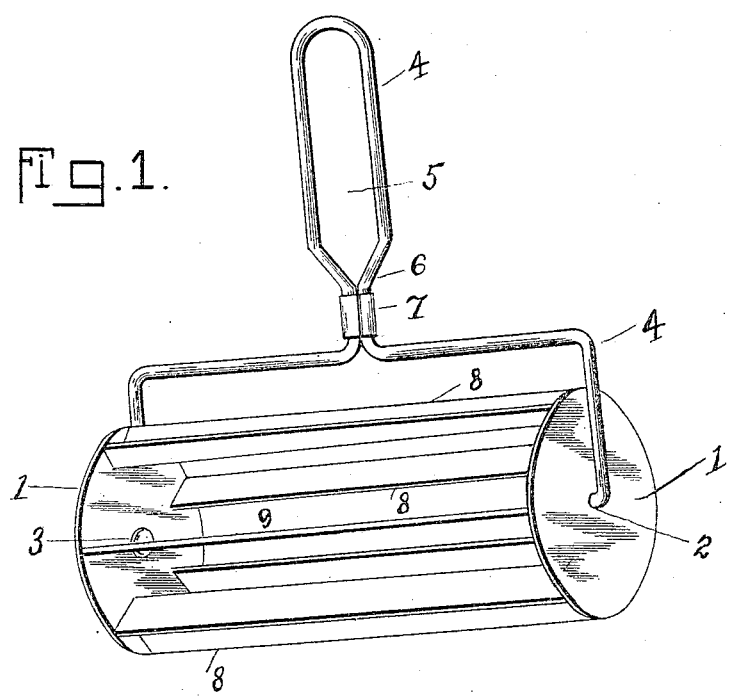
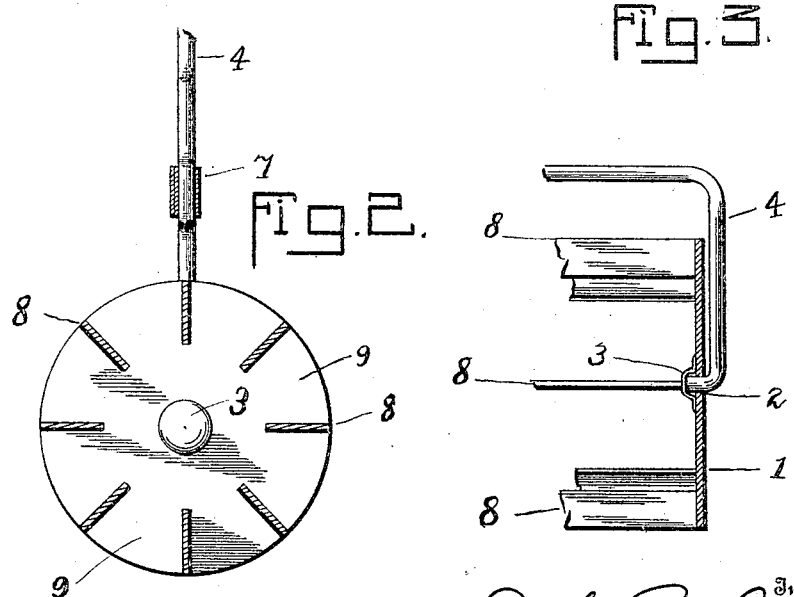
Witnesses
L. P. Langworthy
J. Mason Maughing
Inventor
John R. Listle,
By Watson E. Coleman
Attorney

UNITED STATES PATENT OFFICE.

JOHN R. LISTLE, OF KALISPELL, MONTANA.

CAKE-CUTTER.

No. 801,466.  Specification of Letters Patent.  Patented Oct. 10, 1905.

Application filed November 3, 1904. Serial No. 231,213.

*To all whom it may concern:*

Be it known that I, JOHN R. LISTLE, a citizen of the United States, residing at Kalispell, in the county of Flathead and State of Montana, have invented certain new and useful Improvements in Cake-Cutters, of which the following is a specification, reference being had therein to the accompanying drawings.

My invention relates to cake-cutters, and more particularly to that classification wherein the cutter is made to revolve, one of the objects being to provide a device of the character described that shall be simple and inexpensive in construction and effective in operation.

A further object is to provide a device by which cakes of a uniform size may be cut from the dough, leaving a minimum amount of material to be worked over the second time, and one that is especially adapted to the cutting of doughnuts, ladyfingers, fancy pastry, &c.

In the drawings accompanying this specification and made a part hereof, Figure 1 is a perspective view of my said invention. Fig. 2 is a transverse section. Fig. 3 is a detailed view, partly in section.

Like reference-numerals designate corresponding parts in all the figures of the drawings.

1 designates a disk, of tin or other desirable material, the peripheral edge of which is adapted to operate as a cutter, a hole 2 in the center thereof, and a bearing 3 secured thereto, in which is journaled one end of a forked handle 4. This bearing 3 is preferably made of solder, so that it will securely adhere to the disk 1. The handle 4 is preferably formed of a single piece of wire bent to form an oblong loop 5, which is grasped by the hand of the operator, said loop being narrowed at 6 and the two strands held together by a sleeve 7. Between the disks 1 are arranged a plurality of horizontal cutting-blades 8. These cutting-blades are comprised of narrow strips of tin or other suitable material and are arranged so that the outer edge thereof is even with the periphery of each of the disks 1, the said cutters being rigidly secured at each end to the disks, as shown.

The strips of tin being narrow, this arrangement of parts leaves a blank space back of the blades, which is adapted to receive the dough when cut, thus avoiding the difficulty heretofore experienced in cake-cutters of the dough sticking between the blades or in the pocket formed by the rear edges of the blades coming together. When the dough passes to the blank space back of the blades, it is readily shaken out upon the board by the operator, thus resulting in saving of time and labor.

In operation after the dough is rolled out to form a sheet of the desired thickness the operator by means of the handle 4 rolls the disks over the dough, and this action brings the cutters into contact therewith, so that the cakes are cut of a size and shape corresponding to the spaces 9 between said cutters, said cutters being arranged radially with respect to the axis of the disks.

Having thus described my said invention, what I claim as new, and desire to secure by Letters Patent of the United States, is—

A cake-cutter comprising a plurality of disks, a plurality of narrow cutting-blades rigidly secured to the disks at the outer edges thereof leaving a blank space back of said blades adapted to receive the dough when cut, said blades being arranged radially with respect to the axis of the disks, in combination with a handle on which the disks are rotatably mounted.

In testimony whereof I hereunto affix my signature in presence of two witnesses.

JOHN R. LISTLE.

Witnesses:
FRANK L. GRAY,
HENRY GERLEMAN.